United States Patent
Liu et al.

(10) Patent No.: US 7,495,825 B2
(45) Date of Patent: Feb. 24, 2009

(54) INTEGRATION OF A GAIN EQUALIZATION FILTER IN A GAIN MEDIUM

(75) Inventors: Jian Liu, Sunnyvale, CA (US); Steve Wang, San Jose, CA (US); Xuejun Lu, Fremont, CA (US); Yonglin Huang, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/775,820

(22) Filed: Jul. 10, 2007

(65) Prior Publication Data

US 2007/0253664 A1 Nov. 1, 2007

Related U.S. Application Data

(62) Division of application No. 10/696,304, filed on Oct. 27, 2003, now abandoned.

(60) Provisional application No. 60/422,679, filed on Oct. 30, 2002.

(51) Int. Cl.
*H04B 10/17* (2006.01)
*H04B 10/12* (2006.01)

(52) U.S. Cl. .................. 359/337.21; 359/337.1

(58) Field of Classification Search .......... 359/337.1, 359/337, 21, 337.21
See application file for complete search history.

(56) References Cited

U.S. PATENT DOCUMENTS

| 5,260,823 | A  | 11/1993 | Payne et al. |
| 5,659,644 | A  | 8/1997  | DiGiovanni et al. |
| 5,740,292 | A  | 4/1998  | Strasser |
| 5,920,424 | A  | 7/1999  | Espindola et al. |
| 6,034,812 | A  | * 3/2000 | Naito ............... 359/337.11 |
| 6,377,396 | B1 | 4/2002  | Sun et al. |
| 6,392,789 | B1 | 5/2002  | Pack et al. |
| 6,414,787 | B2 | 7/2002  | Lutz et al. |
| 6,900,930 | B2 | 5/2005  | Ovadia et al. |
| 6,961,502 | B1 | 11/2005 | Wysocki et al. |
| 2001/0036335 | A1 | 11/2001 | Tsuda et al. |

OTHER PUBLICATIONS

Hill, et al., Bragg Grating Fabricated in Monomode Photosensitive Optical fiber by UV Exposure Through a Phase Mask, Applied Physics Letters, vol. 62, No. 10, Mar. 8, 1993, pp. 1035-1037.
Band Wavlength Division Multiplexing (4 Skip 0), AFOP, Mar. 14, 2002, available at http://www.afop.com/news/2002/031302_ofc2002.php.
Ivan Maksymyk, Apodized Phase Masks Streamline Fabrication of FBGs, WDM Solutions, Sep. 2001, available at http://lw.pennnet.com/articles/article_display.cfm?Section=ARCHI&C=FEATU&ARTICLE_ID=118327&KEYWORDS=Apodized%20Phase%20Masks%20streamline%20fabrication%20of%20fbgs.
Erbium Doped Fiber Amplifier, ADVA Optical Service & Solutions, available at http://www.ing.unipi.it/~d7384/com_ottiche/Pdf/ErbiumDopedFiberAmplifier.pdf.
Article entitled "Erbium-Doped Fiber—High Performance Fibers for Superior Amplifier Design" copyright 2001, OFS Specialty Photonics Division, available at http://www.ofsoptics.com.

* cited by examiner

*Primary Examiner*—Eric Bolda
(74) *Attorney, Agent, or Firm*—Workman Nydegger

(57) ABSTRACT

An optical waveguide for use in amplifying light signals with an integrated gain equalization filter. The optical waveguide includes a gain section for amplifying light signals. The optical waveguide further includes an equalization filter to improve the uniformity of optical gain over a wavelength range for which the gain section is intended to provide amplification.

27 Claims, 6 Drawing Sheets

INTEGRATION OF A GAIN EQUALIZATION FILTER IN A GAIN MEDIUM

CROSS-REFERENCE TO RELATED APPLICATIONS

This application is a division of U.S. patent application Ser. No. 10/696,304 filed Oct. 27, 2003, abandoned, which claims the benefit of U.S. Provisional Patent Application No. 60/422,679, filed Oct. 30, 2002, entitled Integration of Gain Equalization Filter in a Gain Medium. Both applications are hereby incorporated by reference herein in their entirety.

BACKGROUND OF THE INVENTION

1. The Field of the Invention

The present invention relates generally to optical amplifiers for amplifying a plurality of optical wavelength channels. More specifically, the invention relates to equalizing gain in an optical amplifier for a plurality of optical wavelength channels.

2. The Relevant Technology

In the field of data transmission, one method of efficiently transporting data is through the use of fiber-optics. Digital data is propagated through a fiber-optic cable using light emitting diodes or lasers. Light signals allow for high transmission rates and high bandwidth capabilities. Also, light signals are resistant to electro-magnetic interferences that would otherwise interfere with electrical signals. Light signals are more secure because they do not allow portions of the signal to escape from the fiber-optic cable as can occur with electronic signals in wire-based systems. Light signals also can be conducted over greater distances without the signal loss typically associated with electronic signals on wire-based systems.

While signal loss in a fiber-optic cable is less than that in wire-based systems, there is nonetheless some signal loss over the distances that light signals may be transmitted. To compensate for the signal loss, optical amplifiers are used. Two common optical amplifiers are Raman amplifiers and Erbium Doped Fiber Amplifiers (EDFAs). Both of these amplifiers use characteristics of doped fiber-optic cables to amplify light signals.

The amplifier pumps light onto the fiber-optic cable where the light is at a different frequency than the light signal that is to be amplified. As the light signal and pumped light travel along the fiber-optic cable, energy from the light that is pumped onto the fiber-optic cable is transferred to the light signal. Optical amplifiers use optical pumps, i.e. laser sources, to generate the light that is pumped into the fiber-optic cable.

In some fiber-optic applications, multiple signals may be sent simultaneously by using different wavelengths of light. Each wavelength may be referred to as a channel. For example, the C-band might be used to transmit 40 different channels or wavelengths along the 1530 to 1562 nm bandwidth. In a variety of optical applications it is desirable to amplify each channel with about the same optical gain. However, the optical gain of an optical gain medium, such as the doped fiber-optic cables, depends upon wavelength. Some wavelength channels will experience greater amplification than others. Consequently, a single gain medium does not usually function as a high gain medium having substantially uniform optical gain over an extended wavelength range.

Conventional approaches to providing uniform optical gain over an extended wavelength range typically have more components than desired, require significant numbers of optical interconnects resulting in insertion losses, and typically cost more than desired. Illustratively, EDFAs are widely used to amplify optical signals to compensate for transmission losses and insertion losses caused by interconnection of components and the gain characteristics of EDFAs are a strong function of optical wavelength. Therefore, to achieve substantially uniform optical gain over an extended wavelength for an EDFA requires an additional gain equalization filter (GEF). In a single stage amplifier, GEFs are commonly placed after the final stage of the amplifier. For multi-stage amplifiers, GEFs are sometimes placed between amplifier stages. Each GEF introduces an additional component cost, component size, and requires appropriate packaging to permit it to be optically coupled to other components. Further, physically coupling components together results in some degree of insertion loss for each physical connection.

BRIEF SUMMARY OF THE INVENTION

These and other limitations are overcome by the present invention which relates to systems and methods for equalizing optical gain across multiple wavelengths. In one embodiment of the invention, an optical waveguide is used to amplify optical signals in fiber-optic communications. The optical waveguide includes a first gain portion that provides a gain to one or more wavelengths in an optical signal. The optical waveguide further includes a first gain equalization filter portion that is optically coupled to the first gain portion. The optical waveguide further includes a second gain equalization filter portion that is optically coupled to the first gain portion. The first gain equalization filter portion attenuates a first wavelength, the second gain equalization filter portion attenuates a second wavelength, and the first wavelength is different than the second wavelength.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Amplifiers provide gain to optical signals. As previously stated, however, optical signals often have multiple wavelengths or channels and the gain of each wavelength in optical amplifiers is often related to the wavelength of the optical signals. This results in an undesirable situation where different wavelengths or channels have different gain. The present invention relates to systems and methods for equalizing the gain of wavelengths or channels in an optical signal. In one embodiment of the present invention, at least one gain equalization filter (GEF) is integrated into an optical waveguide structure that includes one or more gain sections. By integrating the GEF with the gain sections in an optical waveguide, insertion loss and component cost are reduced when compared to an assembly of discrete components. Optical signals entering the waveguide experience amplification in gain sections of the waveguide and wavelength selective attenuation in the GEF section(s) of the waveguide, thereby equalizing the gain of the optical amplifier across multiple wavelengths or channels.

Figure 1:
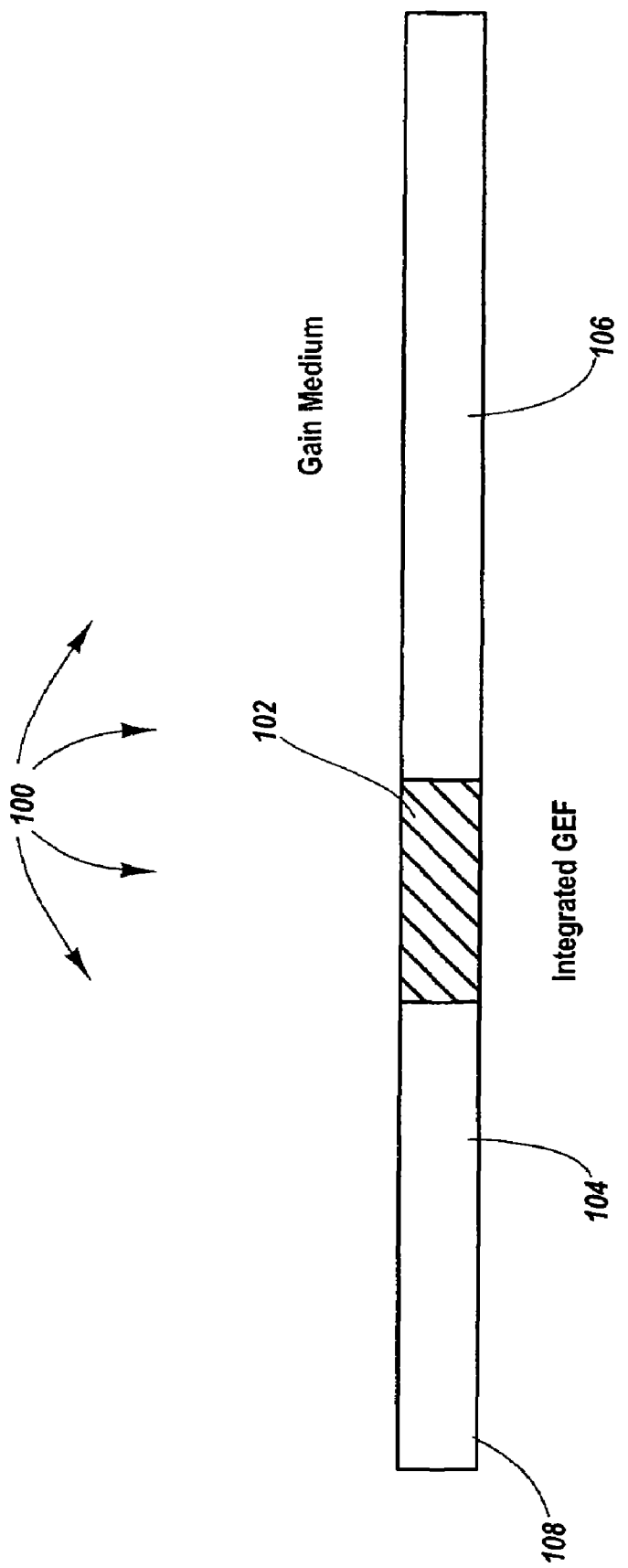
FIG. 1 illustrates one embodiment of a gain equalization filter integrated in the gain medium.

The optical waveguide 100 in FIG. 1 is an example of a waveguide that includes a GEF section 102 disposed between a first gain section 104 having a first length and a second gain section 106 having a second length. More generally, however, it is understood that the present invention may be expanded to include other configurations, such as a GEF integrated with a single gain section, multiple GEF sections, such as additional GEF sections disposed proximate one or more ends of the gain sections, or amplifiers having three or more gain sections coupled by two or more GEF sections.

In the embodiment illustrated in FIG. 1, light input to the first end 108 of the waveguide 100 is amplified in the first gain section 104, which may for example, be designed to function as a high gain, low noise gain section. The optical gain in the first gain section 104 depends upon wavelength. Consequently, after traveling through the length of the first gain section 104, some wavelengths or channels are amplified more than other wavelengths. The GEF section 102 has loss characteristics selected to reduce the non-uniformity in gain associated with the first gain section 104. Additionally, the GEF section 102 may be designed to pre-compensate for gain non-uniformities in subsequent gain sections. Any number of GEFs can be integrated with any number of gain sections in any order.

The waveguide 100 may be an optical fiber, such as a single mode fiber, a multimode fiber, or a double clad fiber, although it is understood that other types of waveguides may also be used. Examples of gain medium for optical fibers include but are not limited to, fibers doped with Erbium, Yb, Sm, Tm or any combination thereof, because these materials may be optically pumped to provide gain at common optical network wavelengths.

A variety of techniques may be used to form a GEF in a waveguide. For example, the GEF can be a UV written Bragg grating in the gain medium, a mechanical perturbation, electrically induced grating or an etched grating. The shape of the optical loss characteristics of the GEF may be selected using a variety of techniques. For example, if the GEF is formed from Bragg gratings, a series of Bragg gratings at different Bragg wavelengths may be formed to create a composite loss characteristic to flatten the optical gain. A GEF may be formed inside the core of the waveguide, in the cladding, or in both. A GEF formed from one or more gratings may use a variety of grating designs, such as slanted or unslanted gratings, Bragg gratings or long period gratings.

Figure 2:
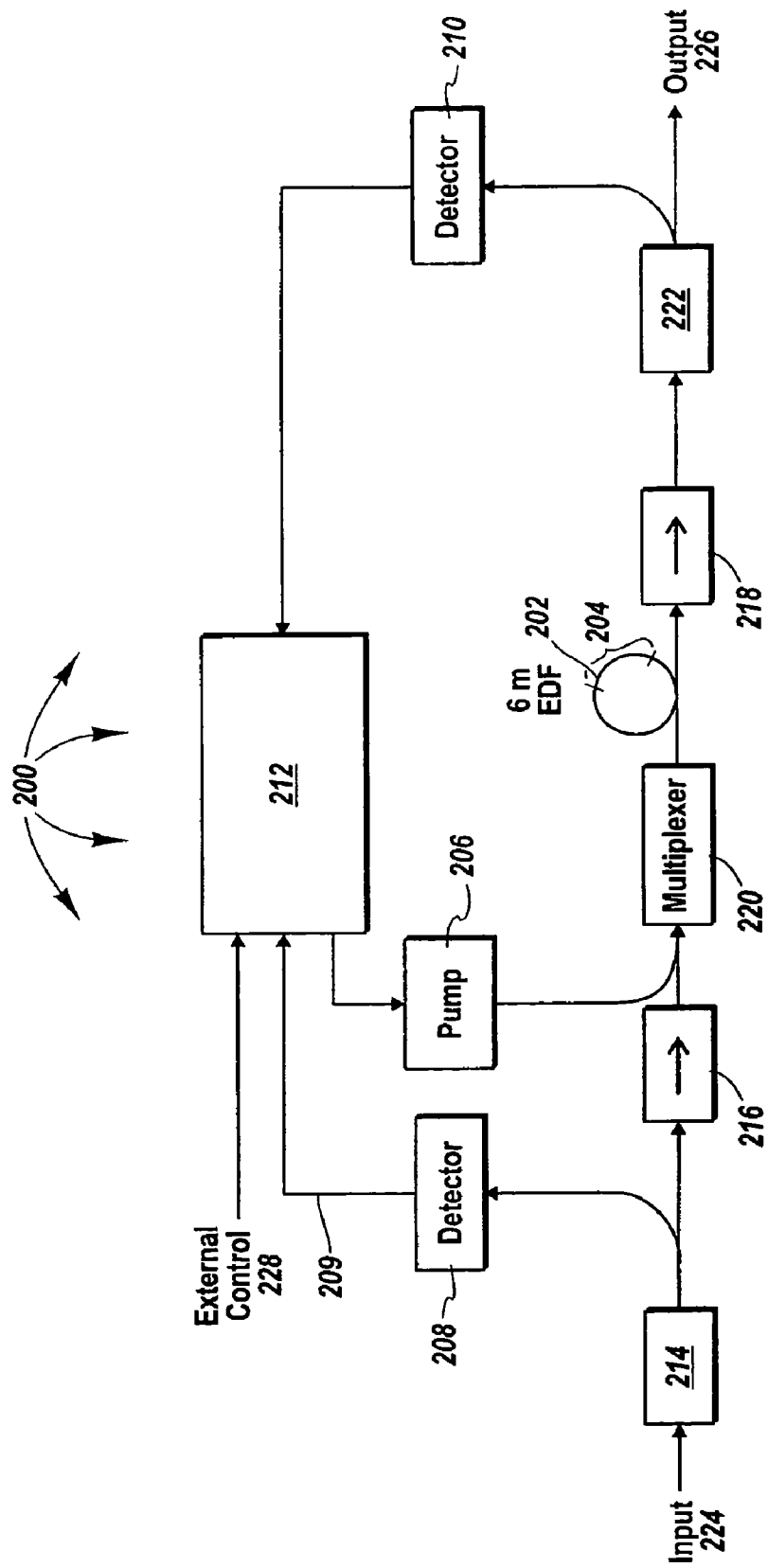
FIG. 2 illustrates an exemplary erbium doped amplifier that implements a gain equalization filter.

One embodiment of the present invention is an erbium doped fiber amplifier (EDFA). FIG. 2 shows an exemplary EDFA 200 including a segment of erbium doped fiber (EDF) 202 including an integrated GEF 204. Other components include a pump laser 206 for providing light at a pump wavelength, an input detector 208 for monitoring input power, an output detector 210 for monitoring output power, a controller 212 for selecting the pump power level, an input tap 214 for tapping off a portion of an input signal to the input detector 208, an output tap 222 for tapping off a portion of the amplified signal to the output detector 210, optical isolators 216 and 218 to reduce harmful back reflections, and a multiplexer 220 to couple input wavelength channels and pump laser 206 lighting to an input end of the EDF 202.

Referring to FIG. 2, amplifying a light or optical signal is demonstrated. A light signal is input into the input 224 of the EDFA 200. A portion of the light signal is tapped by the input tap 214. This portion of the light signal is detected by the detector 208, that may be a photo diode or other suitable photo detector that converts information about the light signal into a first electronic signal 209. The first electronic signal 209 is received by a controller 212 and is used in regulating the EDFA 200.

The remainder of the light signal that was not tapped by the input tap 214 is passed through an optical isolator 216 that prevents back reflections. The light signal is then fed into a multiplexer 220. Meanwhile, the controller 212 controls a pump laser 206 that is also connected to the multiplexer 220 for pumping light into the multiplexer where the pumped light will be multiplexed with the light signal. The pump laser 206, in this example, is controlled by a signal input at an external control 228 and based on the value of the first electronic signal 209 from the detector 208. The external control 228 may provide the desired output power information for each channel. The external control 228 may also specify the spectrum shape of output signals across all the channels over a whole wavelength band. Based on the value of the first electronic signal 209 from the detector 208, decisions can be made on how much pumping power is needed by the EDFA 200. The multiplexed light signal and pumped light is propagated onto the EDF 202 to create an amplified light signal. As previously mentioned, the EDF 202 includes a GEF 204 for equalizing the gain of the EDF 202 across a given bandwidth or range of wavelengths.

One example of a broadband EDF is the Lucent GP-980 Erbium-Doped Fiber sold by OFS Specialty Photonics Division of Somerset, N.J. The EDF has a high erbium concentration while aluminum co-doping maintains good efficiency and spectral flatness over the C-Band (1530-1565 nanometers). EDFs such as the GP-980 may be purchased in pre-selected fiber lengths or in spools. In one embodiment, the EDF is a segment of GP-980 fiber approximately six meters in length having a GEF formed on a portion of the fiber.

The amplified signal passes through the optical isolator 218 and to an output tap 222 where a portion of the amplified signal is fed into the output detector 210. The output detector 210 converts the portion of the amplified signal into a second electronic signal 211 containing information about the amplified signal. This second electronic signal 211 can be fed into the controller 212 where the information contained in the electronic signal can be used by the controller 212 in controlling the pump laser 206. The remaining portion of the amplified signal that is not tapped by the output tap 222 is transmitted to the output 226 of the EDFA 200 where it may be transmitted onto a fiber-optic network, or to some other fiber optic component.

Figure 3:
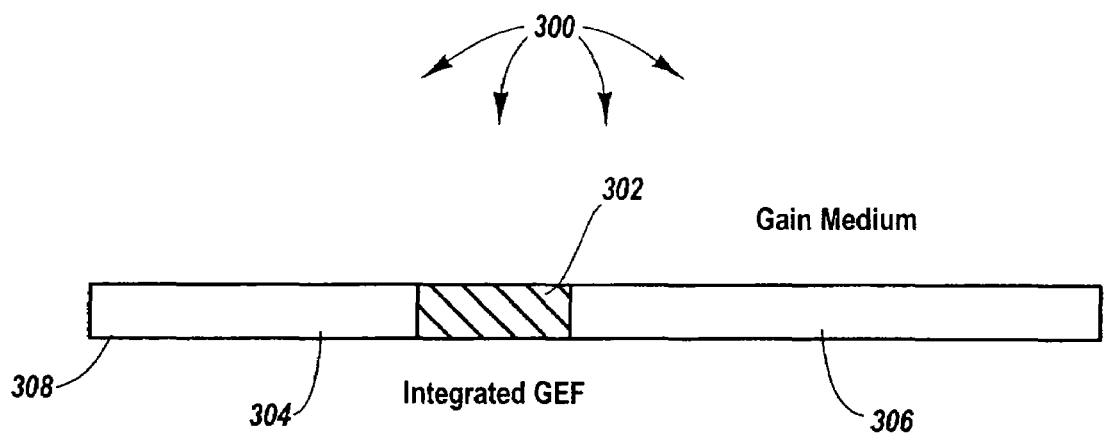
FIG. 3 illustrates an exemplary erbium doped fiber configuration that includes an equalization filter.

FIG. 3 illustrates an exemplary EDF 300 having a length of 6 meters. A GEF section 302 is positioned 2 meters from the input end 308 of the EDF 300. Point A corresponds to an input end 308 of the EDF, the region between points A and B corresponds to a first gain section 304, the region between points B and C corresponds to the GEF section 302, and the region between points C and D corresponds to a second gain section 306 having an output at point D.

The length of each gain section and the optical pump power level determine the required loss characteristics of the GEF. For a low noise, high gain amplifier, the first gain section 304 may, for example, be selected to be long enough to provide an initial desired minimum gain for all wavelength channels for the pump power level. The second gain section 306 may, for example, be designed to provide a higher-level of amplification than the first gain section 304 and consequently have a longer length.

Figure 4:
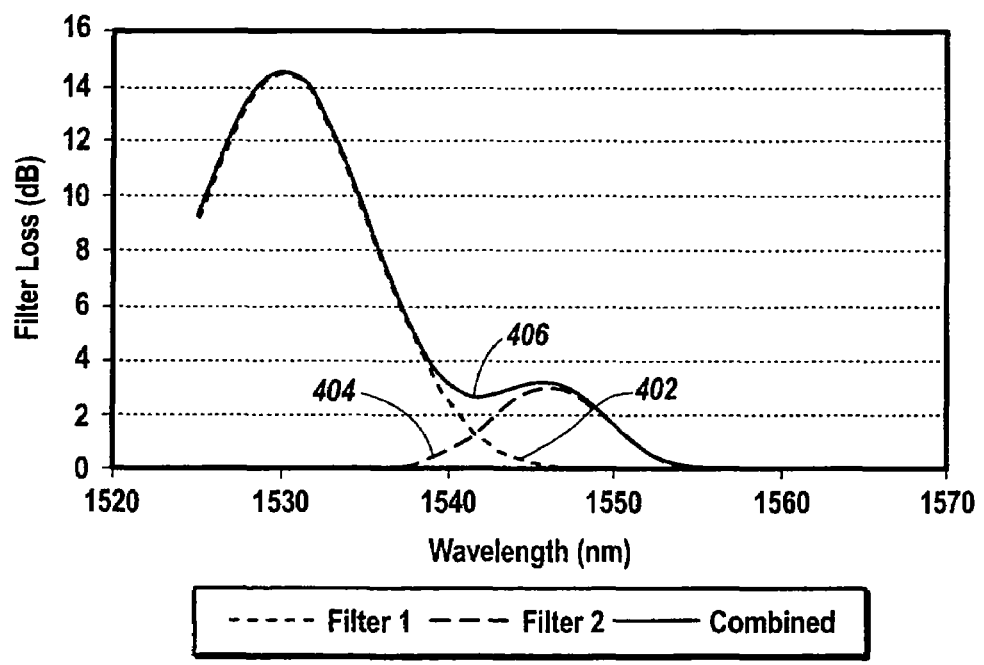
FIG. 4 illustrates a simulated filter response of a gain equalization filter.

OFS also provides an Optical Amplifier Simulation System (OASiX), which models the performance of erbium-doped fiber in design simulations. In a simulation, two simple Gaussian shape filters were used to generate the GEF shape for the EDFA. The Gaussian filters may, for example, be formed from two Bragg gratings formed on a portion of the fiber. FIG. 4 shows the frequency responses of a first Gaussian filter 402 and a second Gaussian filter 404 and their combined profile 406. Each Gaussian filter is formed as described above in a portion of the EDF. It will be understood, of course, that more complex filter designs may be used in addition to that shown in FIG. 4.

Figure 5A:
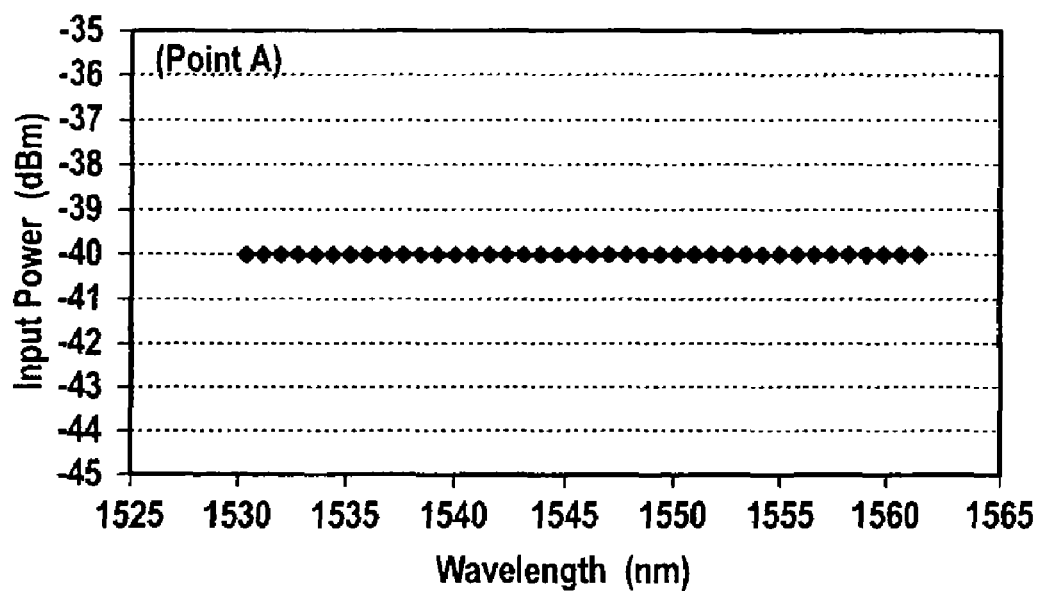
FIGS. 5A-5D illustrate simulations of power spectra at different locations of an erbium doped fiber that includes a gain equalization filter.
Figure 5B:
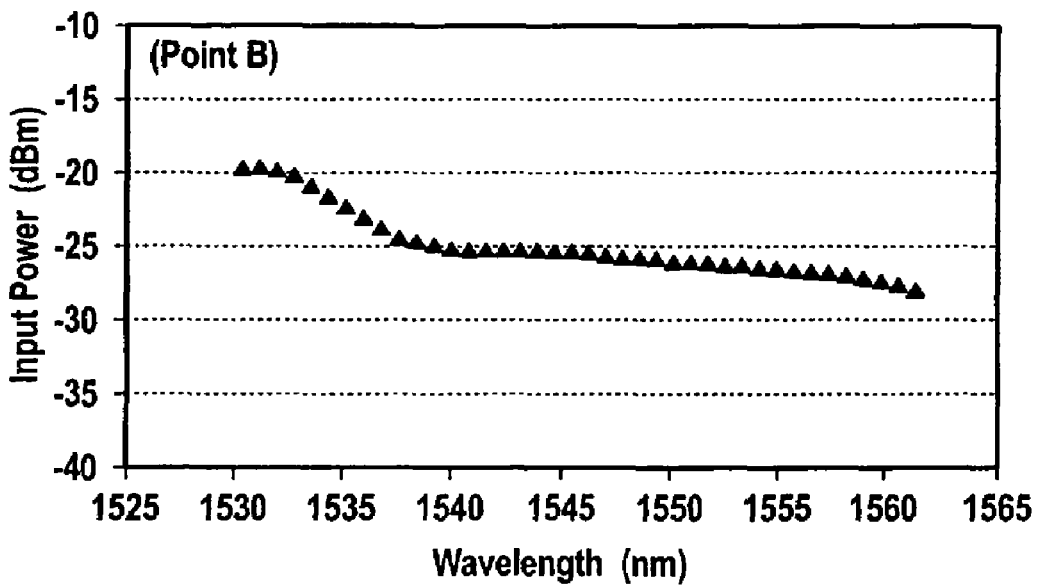
Figure 5C:
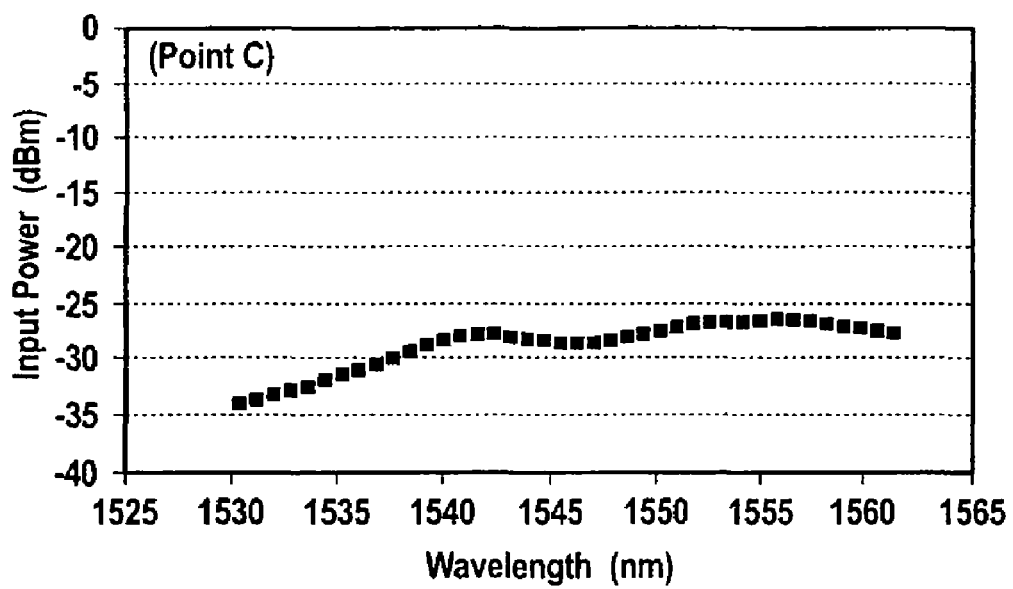
Figure 5D:
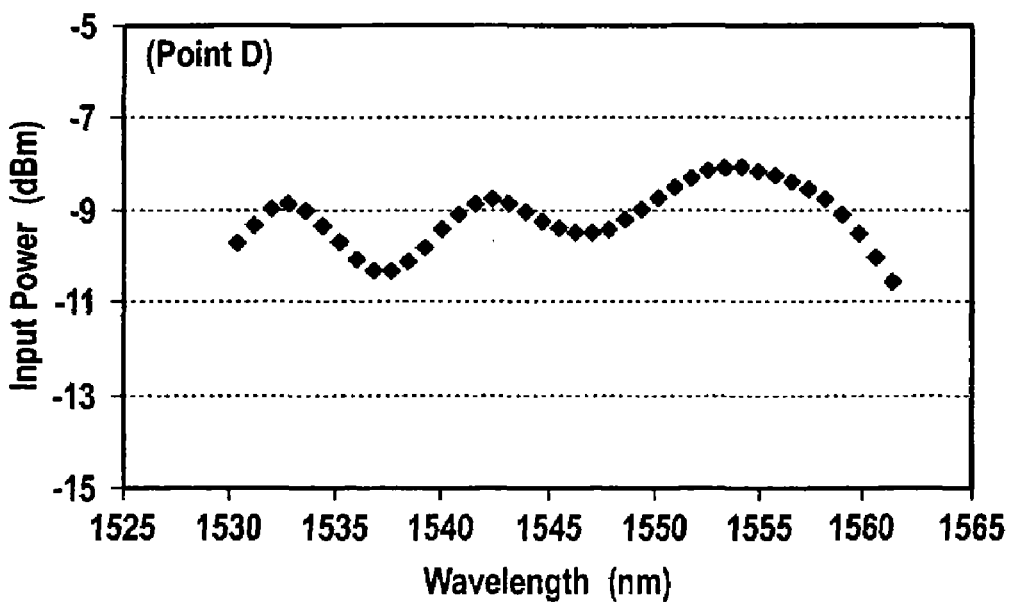

A computer simulation was performed assuming a pump power level input of 30 mW inside the EDF at a wavelength of 977 nm. The input signals have a total of 40 wavelengths in the C-band (1530-1562 nm) at a signal power of −40 dBm/channel. FIG. 5A shows a simulation of the input power levels at point A (FIG. 3) which are assumed to have equal input power levels. FIG. 5B shows a simulation of the input power levels at point B (FIG. 3). Because the gain of the EDF depends upon wavelength, the power level is non-uniform. FIG. 5C shows the power level at point C (FIG. 3) after passing through the GEF. The loss characteristics of the GEF may be selected to compensate for the non-uniform gain between points A and B and to also at least partially pre-compensate for non-uniform gain in the subsequent gain region 306 (FIG. 3). FIG. 5D shows the gain at the output of point D (FIG. 3).

Figure 6:
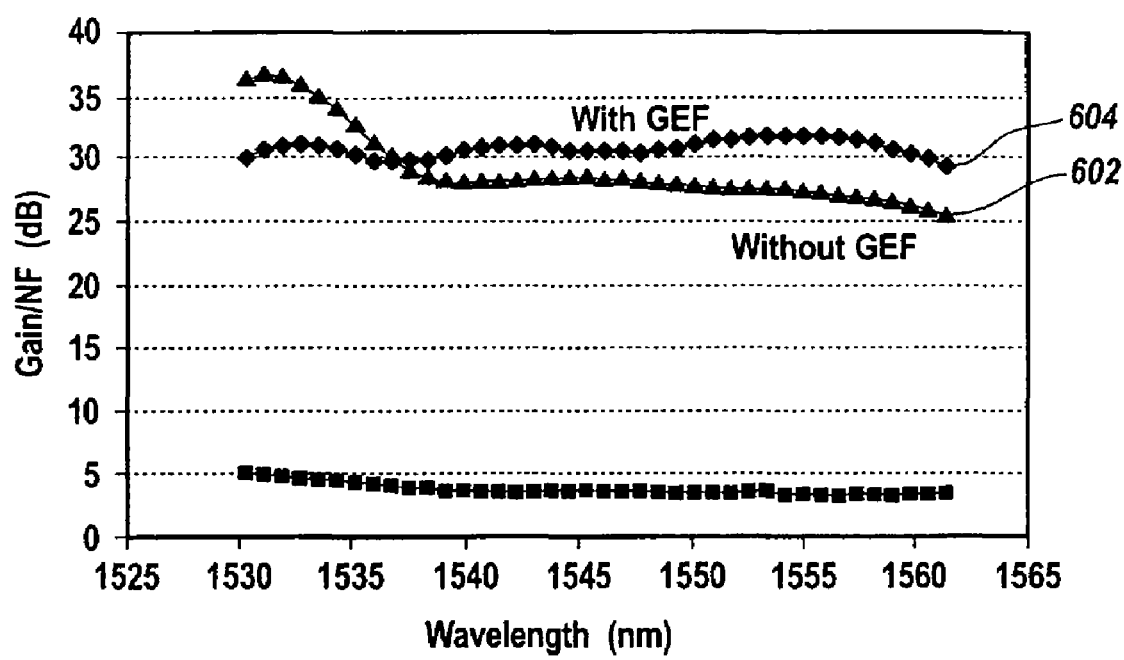
FIG. 6 compares a simulation of the erbium doped fiber amplifier performance with and without an integrated gain equalization filter.

FIG. 6 shows a comparison of gain for an EDF with a GEF and also for an EDF without a GEF. Without the integrated GEF, over a 10 dB difference was noted across the channels as shown by the plot 602. By using the integrated GEF in the EDF, the gain flatness of the 40 channels can be easily controlled to within 2 dB as shown by the plot 604 which is enough for applications such as metro networking applications and the like. Furthermore, simulation also shows that the gain enhancement can be achieved in the long wavelength side of the 40 channels by using the integrated GEF.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical waveguide to amplify optical signals in fiber-optic communications, the optical waveguide comprising:
    a first gain portion that provides a gain to one or more wavelengths in an optical signal;
    a first gain equalization filter portion that is optically coupled to the first gain portion;
    a second gain equalization filter portion that is optically coupled to the first gain portion, wherein:
        the first gain equalization filter portion attenuates a first wavelength;
        the second gain equalization filter portion attenuates a second wavelength; and
        the first wavelength is different than the second wavelength;
    a second gain portion that provides a gain to one or more wavelengths in the optical signal;
    a third gain portion that provides a gain to one or more wavelengths in the optical signal; and
    a third gain equalization filter portion that is optically coupled to the first gain portion.

2. The optical waveguide of claim 1, wherein the gain equalization filter portions include a series of Bragg gratings at different Bragg wavelengths.

3. The optical waveguide of claim 2, wherein the series of Bragg gratings at different Bragg wavelengths are formed to create a composite loss characteristic to flatten the optical gain.

4. The optical waveguide of claim 1, wherein the first portion, first gain equalization filter portion, and second gain equalization portions are disposed in at least one of a single mode fiber, a multimode fiber and a double clad fiber.

5. The optical waveguide of claim 1, wherein at least one of the gain equalization filter portions comprises a UV written Bragg grating in the optical waveguide.

6. The optical waveguide of claim 1, wherein at least one gain equalization filter portion comprises a mechanical perturbation of the optical waveguide, an electrically induced grating, or an etched grating.

7. The optical waveguide of claim 1, wherein the optical waveguide further comprises an inside core surrounded by a cladding, wherein at least one gain equalization filter portion is formed in at least one of the inside core or the cladding.

8. The optical waveguide of claim 1, further comprising a doped portion that is doped with at least one of Erbium, Yb, Sm and Tm, wherein the doped portion includes at least one of the at least one gain portion and at least one gain equalization filter portion.

9. The optical waveguide of claim 1, wherein at least one gain equalization filter portion includes a plurality of discrete segments.

10. The optical waveguide of claim 1, wherein at least one gain equalization filter portion includes a plurality of Gaussian shaped filters.

11. The optical waveguide of claim 1 wherein the first and second gain equalization filter portions selectively attenuate the one or more wavelengths such the gain of each wavelength in the optical signal is within 2 dB of each other wavelength in the optical signal.

12. The optical waveguide of claim 1, wherein the gain equalization filter portions are configured to filter input signals having a wavelength between 1530 nanometers and 1562 nanometers.

13. The optical waveguide of claim 1, further comprising a second gain section, wherein the second gain section has a longer length than the first gain section.

14. The optical waveguide of claim 1, further comprising a doped portion that is doped with at least one of Sm and Tm, wherein the doped portion includes at least one of the first gain portion and the first and second gain equalization filter portions.

15. The optical waveguide of claim 1, wherein the first gain equalization filter portion includes a slanted grating.

16. The optical waveguide of claim 1, wherein the first gain equalization filter portion includes an unslanted grating.

17. The optical waveguide of claim 1, wherein the first gain equalization filter portion includes a long period grating.

18. The optical waveguide of claim 1, further comprising a second gain portion that provides a gain to a second wavelength in the optical signal, wherein the first gain portion that provides a gain to a first wavelength in the optical signal.

19. The optical waveguide of claim 1, further comprising a second gain portion, wherein the first gain portion is designed to provide a lower-level of amplification than the second gain portion.

20. The optical waveguide of claim 1, wherein the first gain portion is disposed between the first gain equalization portion and the second gain equalization portion.

21. The optical waveguide of claim 20, wherein the second gain portion is disposed between the second gain equalization filter portion and the third gain equalization filter portion.

22. The optical waveguide of claim 21, wherein the first gain equalization portion is disposed at a first end of the optical waveguide.

23. The optical waveguide of claim 22, wherein the third gain portion is disposed at a second end of the optical waveguide.

24. The optical waveguide of claim 20 wherein the second gain equalization portion is disposed adjacent to the third gain equalization portion.

25. An optical amplifier comprising the optical waveguide of claim 1, the optical amplifier further comprising:
   a pump laser coupled to the optical waveguide, the pump laser configured to pump a pumping signal onto the optical waveguide for amplifying an optical signal input into the optical waveguide; and
   a controller coupled to the pump laser configured to control the power of the pumping signal pumped onto the optical waveguide.

26. An optical waveguide to amplify optical signals in fiber-optic communications, the optical waveguide comprising:
   a first gain portion that provides a gain to one or more wavelengths in an optical signal;
   a first gain equalization filter portion that is optically coupled to the first gain portion; and
   a second gain equalization filter portion that is optically coupled to the first gain portion, wherein:
      the first gain portion is disposed between the first gain equalization portion and the second gain equalization portion;
      the first gain equalization filter portion attenuates a first wavelength;
      the second gain equalization filter portion attenuates a second wavelength; and
      the first wavelength is different than the second wavelength.

27. An optical waveguide to amplify optical signals in fiber-optic communications, the optical waveguide comprising:
   a first gain portion that provides a gain to one or more wavelengths in an optical signal;
   a first gain equalization filter portion that is optically coupled to the first gain portion; and
   a second gain equalization filter portion that is optically coupled to the first gain portion, wherein:
      the first gain equalization portion is disposed between the first gain portion and the second gain equalization portion;
      the first gain equalization filter portion attenuates a first wavelength;
      the second gain equalization filter portion attenuates a second wavelength; and
      the first wavelength is different than the second wavelength.

* * * * *

UNITED STATES PATENT AND TRADEMARK OFFICE
CERTIFICATE OF CORRECTION

PATENT NO.       : 7,495,825 B2                                    Page 1 of 1
APPLICATION NO.  : 11/775820
DATED            : February 24, 2009
INVENTOR(S)      : Lui et al.

It is certified that error appears in the above-identified patent and that said Letters Patent is hereby corrected as shown below:

Fig. 2
Modify to add the label "211" as shown in the drawing below.

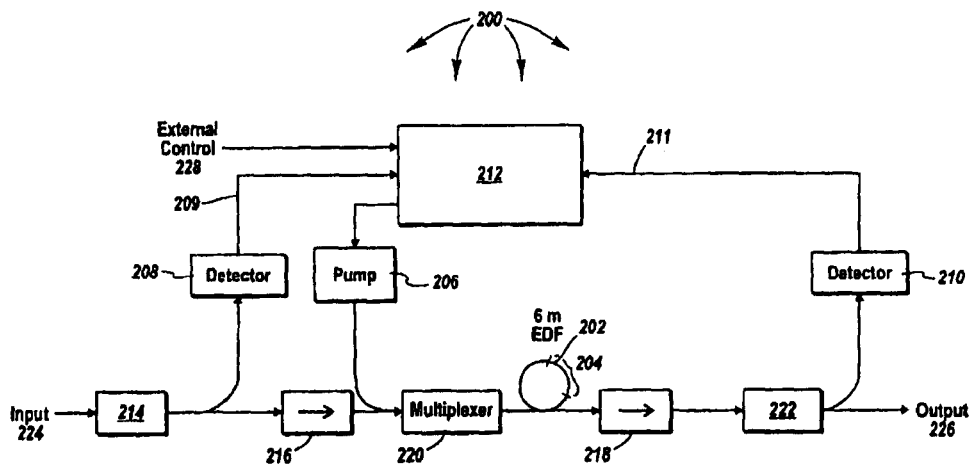

Fig. 2

Column 6
Line 49, change "such the" to --such that the--.

Signed and Sealed this

Thirteenth Day of July, 2010

David J. Kappos
*Director of the United States Patent and Trademark Office*